United States Patent [19]
Robinette et al.

[11] Patent Number: 5,342,162
[45] Date of Patent: Aug. 30, 1994

[54] TOW DOLLY

[76] Inventors: Larry Robinette, 15 Santuck St., Greenville, S.C. 29611; Carl Gibson, 155 Edith Dr., Taylors, S.C. 29687

[21] Appl. No.: 54,574

[22] Filed: Apr. 30, 1993

[51] Int. Cl.⁵ .................................................. B60P 1/28
[52] U.S. Cl. ....................................... 414/483; 280/402; 414/537; 414/563
[58] Field of Search ................................. 414/482–485, 414/537, 563; 280/402, 79.4

[56] References Cited

U.S. PATENT DOCUMENTS

| | | | |
|---|---|---|---|
| 2,541,582 | 2/1951 | Hawkins | 280/402 |
| 2,803,362 | 8/1957 | Saenz | 414/483 X |
| 3,025,985 | 3/1962 | Crawford | 414/537 |
| 3,311,245 | 3/1967 | Galey | 414/537 |
| 3,338,440 | 8/1967 | Donahue | 414/482 |
| 3,368,827 | 2/1968 | Dashew | 414/482 X |
| 3,458,074 | 7/1969 | Railey | 414/483 X |
| 3,536,214 | 10/1970 | Sorg et al. | 414/537 |
| 3,547,290 | 12/1970 | Fratzke et al. | 414/483 |
| 3,604,579 | 9/1971 | Jenkins | 414/482 |
| 3,674,167 | 7/1972 | Roberts | 414/484 |
| 3,901,398 | 8/1975 | Bunch | 414/483 |
| 3,913,934 | 10/1975 | Koehn et al. | 414/537 X |
| 3,945,521 | 3/1976 | Decker | 414/483 |
| 4,483,549 | 11/1984 | Nikawa | 414/563 X |
| 4,822,069 | 4/1989 | Burgess | 280/402 |
| 4,921,390 | 5/1990 | Baines | 414/483 |
| 4,968,210 | 11/1990 | Friederich | 414/485 |
| 5,016,897 | 5/1991 | Kauffman | 280/402 |
| 5,090,718 | 2/1992 | Kauffman | 280/402 |
| 5,259,720 | 11/1993 | Lobner | 414/485 X |

FOREIGN PATENT DOCUMENTS 114031  4/1990  Japan .................. 414/485

Primary Examiner—David A. Bucci
Attorney, Agent, or Firm—Richard C. Litman

[57] ABSTRACT

A tow dolly having both ramp loading and tilt loading capability. The dolly includes a vertical pivot bolt to allow the towed vehicle to be more easily maneuvered around turns. Additionally, the dolly has the capacity to be folded to stand on its ramps, and thus assume a substantially upright configuration for storage.

8 Claims, 4 Drawing Sheets

TOW DOLLY

BACKGROUND OF THE INVENTION

1. FIELD OF THE INVENTION

The present invention relates to vehicular transport. More specifically, it relates to a device to be attached to a powered vehicle that can be utilized to pull another vehicle. Even more specifically, it relates to a tow dolly that can use either tilt or ramp loading and that has the capability to be folded up for storage.

2. DESCRIPTION OF THE PRIOR ART

There are a number of reasons why a person would desire to tow one vehicle behind another. The towed vehicle could be disabled in some manner, or the vehicle could be towed behind an recreational vehicle for use at a later time. In either case, one of the disadvantages of the towing devices present on the market today is that, when not in use, the tow dolly takes up an inordinate amount of space. In many cases, the device has to be stored outdoors when not in use, which can lead to weathering of the device, rusting, or other functional or cosmetic deterioration.

There are a number of U.S. Patents that relate to towing devices and implements. The first is U.S. Pat. No. 3,338,440 issued on Aug. 29, 1967 to James C. Donahue. This discloses a farm implement carrier having a wheeled trailer frame and a pair of ramps mounted thereon. These ramps are pivotable to allow both the loading of the implement and then, once the implement has been loaded, the ramps are locked into place by means of a latch arm and a tongue.

In U.S. Pat. No. 3,368,827 issued on Feb. 13, 1968 to Stephen S. Dashew there is disclosed a tilting trailer comprising a horizontal platform resting on wheels and having attached to it a mobile platform. This mobile platform is rotatably and releasably attached to the wheeled platform to allow for the transport and placement of large display items.

Next in this discussion is U.S. Pat. No. 3,547,290 issued on Dec. 15, 1970 to Harold A. Fratzke et al. This patent shows a towing device having a wheeled carriage that is tiltable to allow for the loading of the front end of a vehicle thereon and additionally, the bed is also rotatably mounted to the axle to allow for turning movements during towing.

In U.S. Pat. No. 3,674,167 issued on Jul. 4, 1972 to Bisset J. Roberts there is disclosed a vehicle ambulance wherein a main support that is attached to a truck or the like includes a pair of platform members that can be lowered to permit the loading of a disabled vehicle. The device includes a guide frame for loading the disabled vehicle that is connected to a extensible and retractable fluid motor. The platform members are additionally pivotable to a substantially vertical position to function both as a safety or travel stop for the carried vehicle and a mounting platform for a light assembly.

U.S. Pat. 3,913,934 issued on Oct. 21, 1975 to Franklin E. Koehn et al. discloses a variable width highway trailer. This device includes pivotable ramps for loading and unloading and also includes means to vary the width of the trailer to enable it to carry wide loads.

Another patent of interest is U.S. Pat. No. 4,822,069 issued on Apr. 18, 1989 to David Burgess. This is a collapsible vehicle trailer that mounts on a standard towing dolly. The device can be disassembled for stowing in a truck or other area when not in use.

U.S. Pat. No. 4,921,390 issued on May 1, 1990 to Ronald J. Baines discloses a motor vehicle towing device that includes a supporting frame pivotable about an axis to aid in turning when a vehicle or the like is being towed.

In U.S. Pat. No. 4,968,210 issued on Nov. 6, 1990 to James F. Friederich there is disclosed a vehicle carrier wherein the main frame and the trailer bed interact with one another by piston means and air suspension means.

Lastly, U.S. Pat. Nos. 5,090,708 and 5,016,897, issued on, respectively, May 21, 1991 and Feb. 25, 1992 and both issued to Frank Kauffman disclose multi-function towing trailers. Both of the patents disclose trailers having an H-shaped frame and a carriage assembly. The carriage assembly pivotably rotates to allow for the loading and unloading of a vehicle.

None of the above inventions and patents, taken either singly or in combination, is seen to describe the instant invention as claimed.

SUMMARY OF THE INVENTION

The current invention is a tow dolly that has both ramp loading and tilt loading capability. The dolly includes a pivot bolt to allow the towed vehicle to be more easily maneuvered around turns. Additionally, the dolly has the capacity to be folded into a substantially upright configuration for storage.

Accordingly, it is a principal object of the invention to provide a tow dolly that has both a ramp and tilt loading capability.

It is another object of the invention to provide a tow dolly wherein a pivot bolt is provided to aid in turning the device while a vehicle is being towed.

It is a further object of the invention to provide a tow dolly wherein the loading ramps are adjustable for added clearance with the underside of the vehicle after it has been loaded.

It is still yet a further object of the invention to provide a tow dolly having the capacity to be folded to stand on its ramps, and thus assume a substantially upright configuration for storage.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

This discussion of the present invention is best presented by introducing the three main sections of the tow dolly separately, and then discussing how they function as a whole.

Figure 2:
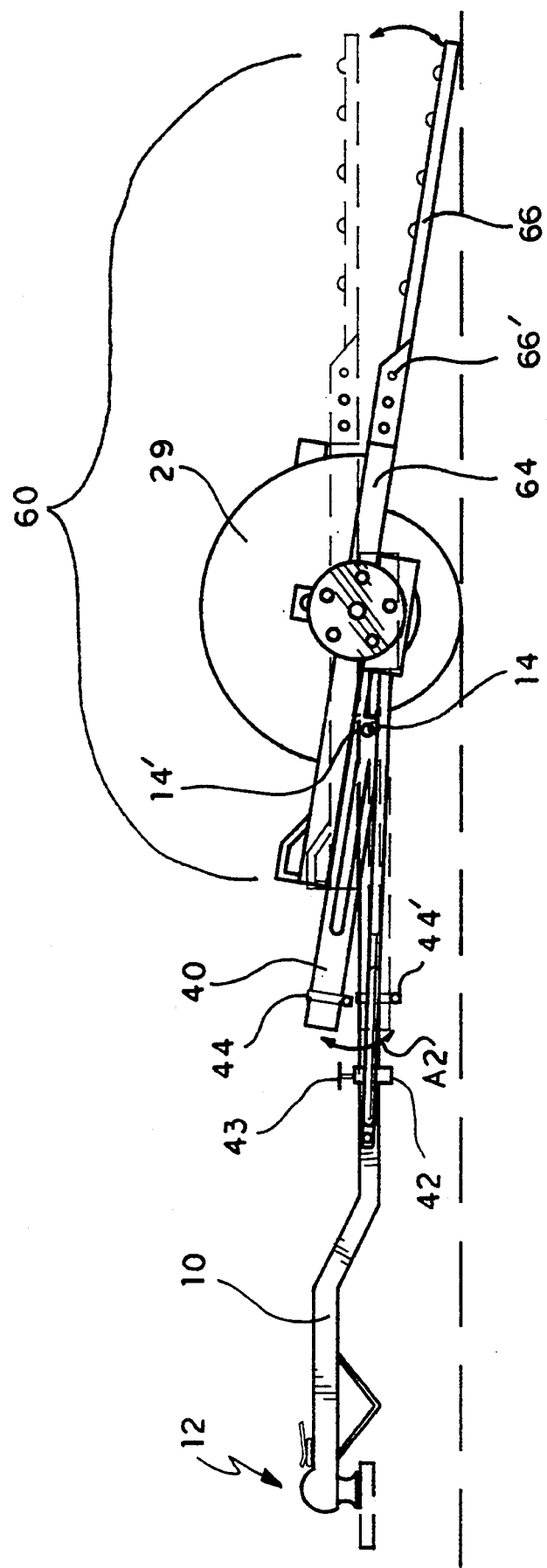
FIG. 2 is a side view of the tow dolly showing the tilt loading ability of the device.

The first section under discussion is the longitudinal frame member 10. At one end, the frame member 10 has a hitching assembly 12 that is of a well known type to allow the tow dolly T to be releasably engaged with a vehicle. Proximate the other end of the longitudinal frame assembly 10 is the horizontal pivot point 14, as seen in FIG. 2. In this preferred embodiment, this region in the longitudinal frame assembly 10 is made up of a number of apertures (not shown) that are adapted to receive a pivot pin 14' (as seen in FIG. 2). This will be discussed further below.

Figure 3:
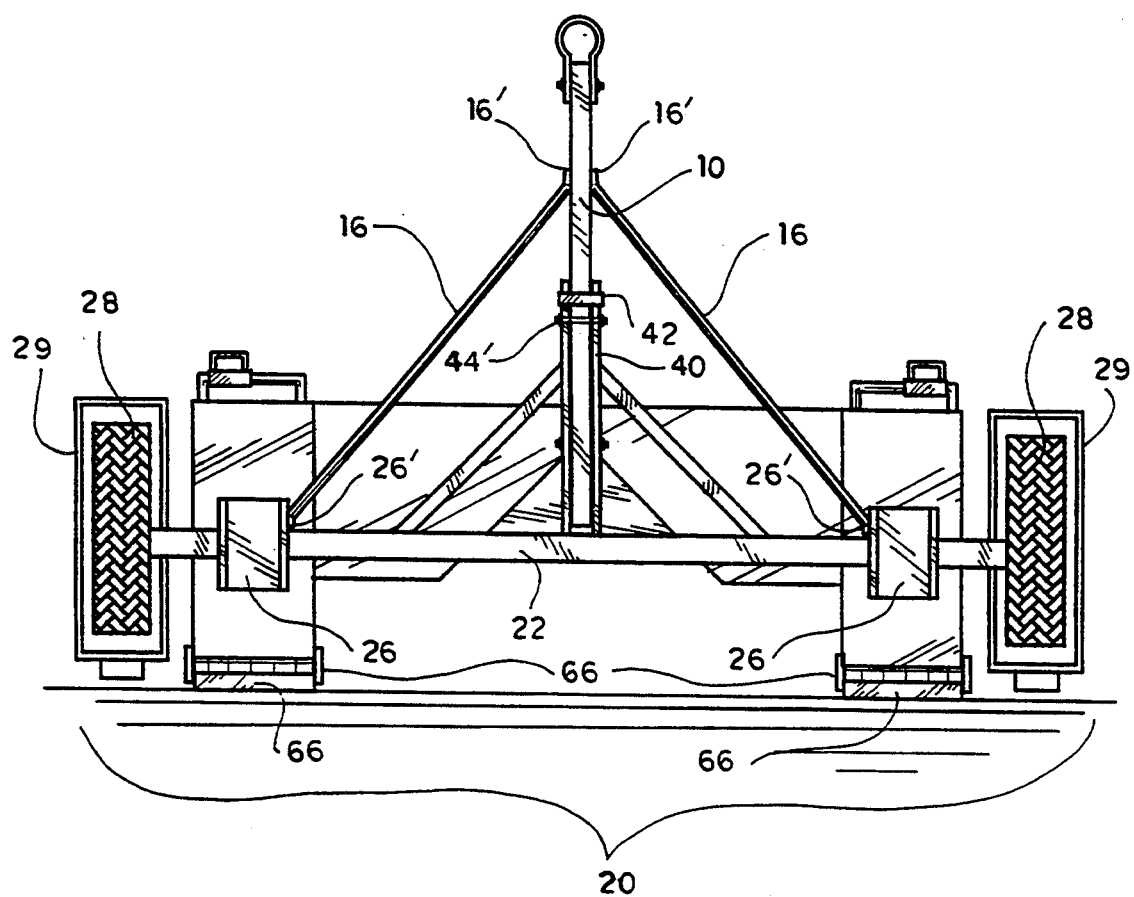
FIG. 3 is a rear view with the dolly in the upright stowage position.

The second section of the tow dolly T is the first tiltable member 20, best seen in FIG. 3. This consists of the lateral brace means 22 which includes, proximate its midsection, a vertical pivot point 24, seen in FIG. 1. This, in the preferred embodiment is an aperture designed to receive a bolt 100 (shown in FIG. 1). The second tiltable member 60, discussed below, rotates on this bolt. Integral with the lateral brace means 22 are two wheel receiving means supports 26. Each of these supports 26 are connected by swivel type attachments 26' to tie rods 16 that are, in turn, connected by another swivel type attachment 16' to the longitudinal frame member 10. Proximate each of these supports 26 are wheels 28. The wheels 28 are covered by fenders 29 to prevent the vehicle being towed from being splashed by mud or the like when the device is underway.

Welded onto the lateral brace means 22 is a U-shaped channel 40. This channel is adapted and configured so that it fits snugly over the longitudinal frame member 10. A releasable engagement means is provided between the U-shaped channel 40 and the longitudinal frame member 10. In the embodiment discussed herein, this engagement means is a sleeve or collar 42 that is adapted to slide over both the U-shaped channel 40 and the longitudinal frame member 10. The sleeve 42 additionally has a threaded member 43, such as a wing nut or the like, to fix it in place and to hold the U-shaped channel 40 and the longitudinal frame member 10 firmly together. As an extra safety feature, the present invention includes a retaining pin 44 that can be placed through the apertures in a sleeve 44. If the user should forget to tighten the threaded member 43 on the sleeve 42, this serves as a backup to prevent the unintended tilting of the first and second tiltable members 20, 60.

The third section of the dolly T is the second tiltable member 60, best seen in FIG. 2. This consists of a cross bracing means, a wheel receiving means 64, and a ramp means 66. The cross bracing means, in the preferred embodiment, is made up of two lateral members 62a and 62b. The member 62a has an aperture (not shown) therethrough that defines a vertical pivoting means and allows for the passage of the bolt 100. Thus, the entire second tiltable member 60 can move and roate about on the bolt 100 to aid in turning while a vehicle is being towed. Both the members 62a and 62b have ends that are attached to the wheel receiving means 64. These are generally planar members having an inclined front wheel stop 64a and a ramp travel stop 64b. The ramp means 86 are also generally planar and are attached to the wheel receiving means 64 by adjustable engagement means. In the present embodiment, the means are bolts 66' that can be loosened to allow the ramp means 66 to be swiveled as shown by the arrows A1 in FIGS. 1 and 4.

Figure 1:
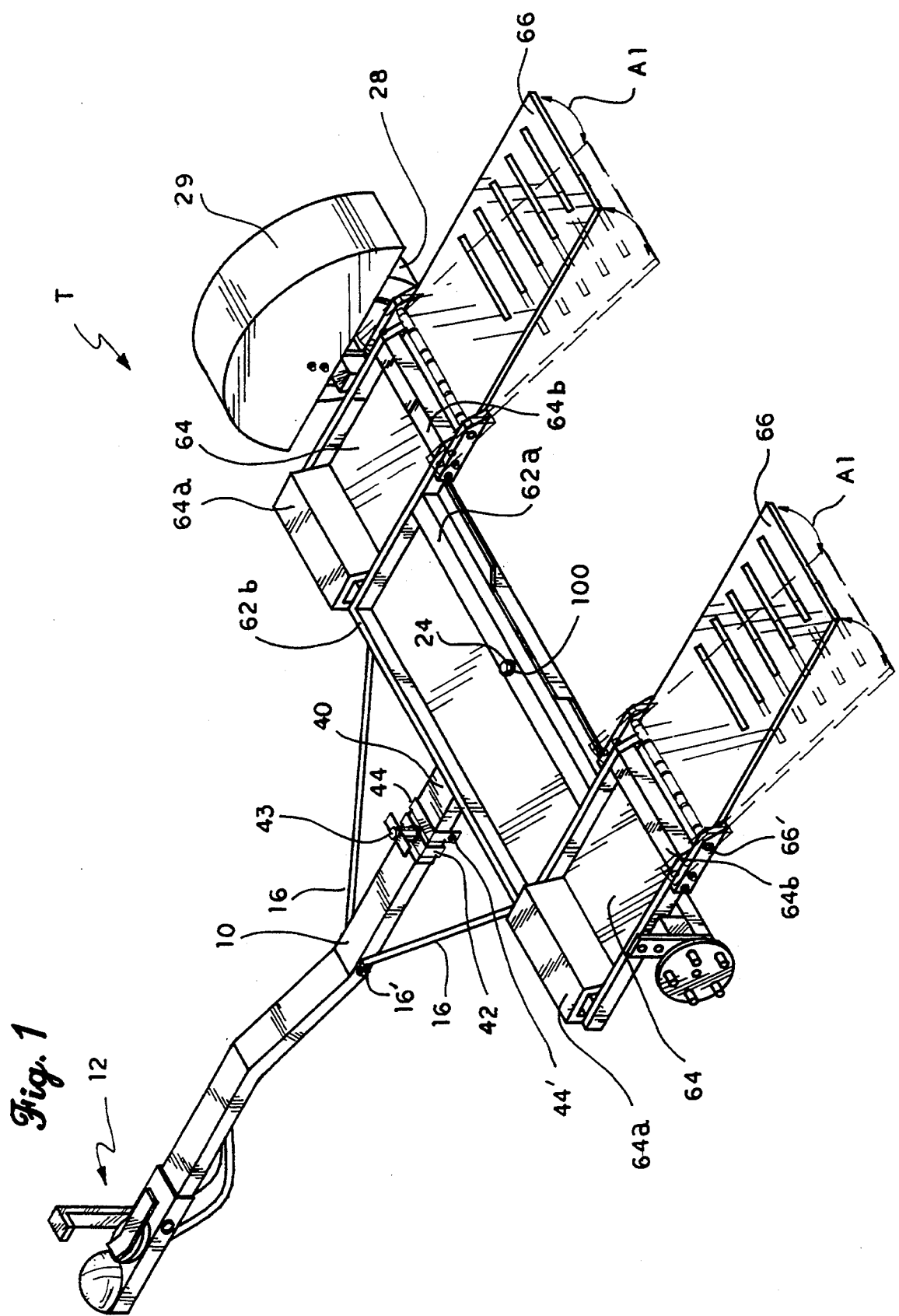
FIG. 1 is a perspective view of the tow dolly showing the ramp movement to allow for loading or unloading a vehicle.

The discussion now turns to the ways that the present invention can be used. Referring to FIGS. 1 and 2, the loading of a vehicle on to the dolly T can be accomplished by either loosening the bolt 66' and lowering the ramp means 66 as seen in FIG. 1 or by loosening the threaded member 43 and sliding the sleeve 42 off of the U-shaped channel 40 to allow both the first tiltable member 20 and the second tiltable member 60 to rotate vertically about the horizontal pivot pin 14' in the direction shown by the arrow A2 in FIG. 2. The vehicle V, shown in broken lines in FIG. 4 can then be maneuvered onto the dolly T so that the front wheels are located on the wheel receiving means 64 and are held loosely in place by the front wheel stops 64a. Then a harness and strap assembly H is tied over the vehicle's wheels to firmly engage the vehicle V in place. As required by law, conventional safety chains with J hooks (not shown) would also be attached to the vehicle V's front axle to serve as a failsafe. While the vehicle V is being towed, the second tiltable member 60 can pivot on the bolt or pin 100 while the dolly T is being towed.

Figure 4:
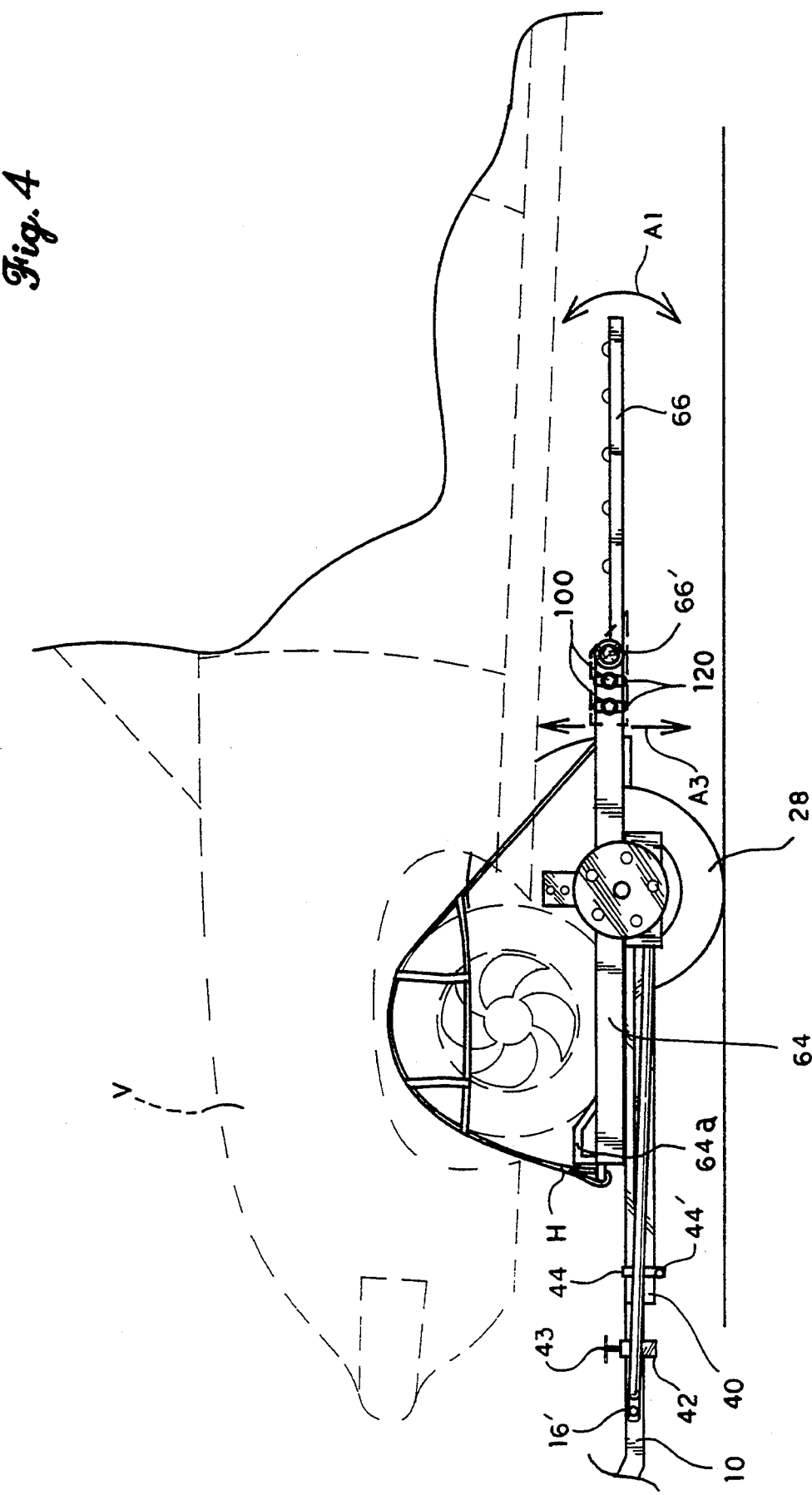
FIG. 4 is a partial side view of the tow dolly showing a vehicle in broken lines mounted thereon and additionally showing the vertical ramp clearance adjustment.

Another feature of the present invention is the vertical ramp clearance adjustment, shown in FIG. 4. After the vehicle V is loaded on the dolly T, if the user desires, the bolt or pin 66' can be removed and the ramps 66 can be adjusted by means of two bolts 110 that are mounted in a pair of oval slots 120. The ramps 66 can then be moved up or down as desired in the direction shown by the arrow A3 in FIG. 4 to prevent the ramps 66 from hitting the undercarriage of the vehicle V during the towing process.

Another feature of the tow dolly is its foldability for storage. As seen in FIG. 3, the dolly T can be stood upon its ramps 66. The bolt 66' is loosened, and this allows a rotation of more than 90 degrees such that each of the ramp travel stops 64b (see FIG. 1) abuts each of the ramps 66 supporting the entire remainder of the dolly T above the ground. This allows for substantially less space being taken up when the device is not in use.

It is to be understood that the present invention is not limited to the sole embodiment described above, but encompasses any and all embodiments within the scope of the following claims.

We claim:

1. A dual tiltable tow dolly for receiving the wheels of a vehicle and allowing the vehicle to be towed comprising:
    a) a main longitudinal frame member having one end adapted to be removably attached to a towing vehicle and the other end configured to act as a horizontal pivot point;
    b) a first tiltable member including:
    a main lateral brace having a vertical pivot point and including a pair of wheel receiving support members and a generally U-shaped channel adapted to fit over said longitudinal frame member and including a horizontal pivot axis, said U-shaped member having means to releasably engage said longitudinal frame member, wherein said releasable engagement means is a sleeve adapted and configured to be slidable along said longitudinal frame member and over said U-shaped channel to hold both in a fixed, proximal relationship;
    a pair of tie rods, each of said tie rods having a swivel connection to said longitudinal frame member and another swivel connection to said wheel receiving support members;

a plurality of rotatably mounted wheels proximate said wheel receiving support members such that said lateral brace is movably supported above the ground;

horizontal pivoting engagement means on said U-shaped channel adapted to engage with said horizontal pivot point on said end of said longitudinal frame member and, thus permitting vertical rotation about said horizontal pivotal engagement point; and c) a second tiltable member including:

cross bracing having a vertical pivoting engagement means adapted to engage with said vertical pivot point on said lateral brace, wherein said vertical pivot point facilitates the turning of said tow dolly with said towing vehicle during a turning maneuver;

a pair of wheel receiving means including ramp travel stops; and a pair of ramps, adjustably engageable with said wheel receiving means, such that said ramps can be fixed in a predetermined relationship with said wheel receiving means; thus, a vehicle to be towed can be loaded on said dolly, selectively, by either releasing said engagement means between said U-shaped member and said longitudinal brace to tilt said first and said second tiltable members so that said pair of ramps contact the ground, or the vehicle can be loaded by adjusting said pair of ramps in relation with said wheel receiving means such that said ramps contact the ground.

2. The tow dolly according to claim 1 wherein said sleeve includes a threaded frictional engagement means to hold said sleeve in place over said longitudinal frame member and said U-shaped channel.

3. The tow dolly according to claim 1 wherein said horizontal pivoting engagement means includes a pivot pin.

4. The tow dolly according to claim 1 wherein said vertical pivoting engagement means includes a pivot pin.

5. A foldable, stowable tow dolly for receiving the wheels of a vehicle and allowing the vehicle to be towed comprising;

a) a main longitudinal frame member having one end adapted to be removably attached to a towing vehicle and the other end configured to act as a horizontal pivot point;

b) a first tiltable member including:

a main lateral brace having a vertical pivot point and including a pair of wheel receiving support members and a generally U-shaped channel adapted to fit over said longitudinal frame member and including means to define a horizontal pivot axis, said U-shaped member having means to releasably engage said longitudinal frame member, wherein said releasable engagement means between said U-shaped channel and said longitudinal frame member is a sleeve adapted and configured to be slidable along said longitudinal frame member and over said U-shaped channel to hold both in a fixed, proximal relationship;

a pair of tie rods, each of said tie rods having a swivel connection to said longitudinal frame member and another swivel connection to said wheel receiving support members;

a plurality of rotatably mounted wheels proximate said wheel receiving support members such that said lateral brace is movably supported above the ground;

horizontal pivoting engagement means on said U-shaped channel adapted to engage with said horizontal pivot point on said end of said longitudinal frame member and, thus permitting vertical rotation about said horizontal pivotal point; and c) a second tiltable member including:

cross bracing having a vertical pivoting engagement means adapted to engage with said vertical pivot point on said lateral brace, wherein said vertical pivot point facilitates the turning of said tow dolly during a turning maneuver;

wheel receiving means including ramp travel stops; and a pair of ramps, including mounting hinges, said hinges arranged and configured such that said ramps can be rotated through at least 90 degrees and come into contact with said ramp travel stops; whereby said dolly can be stood substantially upright so that said dolly stands on said ramps, thus taking up less room when not in use.

6. The tow dolly according to claim 5 wherein said sleeve includes a threaded frictional engagement means to hold said sleeve in place over said longitudinal frame member and said U-shaped channel.

7. The tow dolly according to claim 5 wherein said horizontal pivoting engagement means includes a pivot pin.

8. The tow dolly according to claim 5 wherein said vertical pivoting engagement means includes a pivot pin.

* * * * *